United States Patent
Atluri et al.

(10) Patent No.: US 7,979,656 B2
(45) Date of Patent: Jul. 12, 2011

(54) MINIMIZING CONFIGURATION CHANGES IN A FABRIC-BASED DATA PROTECTION SOLUTION

(75) Inventors: Rajeev Atluri, Corona, CA (US); Kumar Swamy Bhatt, Andhra Pradesh (IN); Yeganjaiah Gottemukkula, Andhra Pradesh (IN); Omkar Gosavi, Andhra Pradesh (IN)

(73) Assignee: Inmage Systems, Inc., Santa Clara, CA (US)

( * ) Notice: Subject to any disclaimer, the term of this patent is extended or adjusted under 35 U.S.C. 154(b) by 534 days.

(21) Appl. No.: 12/186,636

(22) Filed: Aug. 6, 2008

(65) Prior Publication Data

US 2008/0294843 A1 Nov. 27, 2008

Related U.S. Application Data

(63) Continuation-in-part of application No. 10/859,368, filed on Jun. 1, 2004, now Pat. No. 7,698,401, and a continuation-in-part of application No. 11/229,289, filed on Sep. 16, 2005, and a continuation-in-part of application No. 11/438,036, filed on May 19, 2006.

(51) Int. Cl.
*G06F 12/00* (2006.01)
*G06F 12/16* (2006.01)
*G06F 13/14* (2006.01)
*G06F 13/16* (2006.01)

(52) U.S. Cl. ............ 711/162; 711/6; 711/163; 711/165; 709/213; 709/216; 709/229; 709/249

(58) Field of Classification Search .................. 709/213, 709/216, 217; 711/6, 161, 162, 170
See application file for complete search history.

(56) References Cited

U.S. PATENT DOCUMENTS

| | | |
|---|---|---|
| 5,193,181 A | 3/1993 | Barlow et al. |
| 5,313,612 A | 5/1994 | Satoh et al. |
| 5,446,871 A | 8/1995 | Shomler et al. |
| 5,621,882 A | 4/1997 | Kakuta |

(Continued)

FOREIGN PATENT DOCUMENTS

WO WO-2004021677 A1 3/2004

OTHER PUBLICATIONS

U.S. Appl. No. 11/405,236, filed Oct. 18, 2007, Michael et al.

(Continued)

*Primary Examiner* — Jack A Lane
(74) *Attorney, Agent, or Firm* — Raj Abhyanker, P.C.

(57) ABSTRACT

A method, system, and apparatus of minimizing configuration of changes in a fabric-based data protection solution. In one embodiment, a method includes configuring a switch such that a write request to a primary storage device is transferred through a virtual initiator in the switch to the primary storage device and to a secondary storage device, and configuring the switch such that a read request from the secondary initiator of a data in the primary storage device appears as though the read request is coming from a physical initiator rather than the secondary initiator (e.g., such that system protocol may be bypassed because the switch intercepts a response having the data from the primary storage device through a virtual target which uses the virtual initiator of the switch to communicate the data to the secondary initiator rather than the physical initiator).

15 Claims, 6 Drawing Sheets

U.S. PATENT DOCUMENTS

| | | | |
|---|---|---|---|
| 5,664,189 | A | 9/1997 | Wilcox et al. |
| 5,805,785 | A | 9/1998 | Dias et al. |
| 5,875,479 | A | 2/1999 | Blount et al. |
| 5,930,824 | A | 7/1999 | Anglin et al. |
| 6,175,932 | B1 | 1/2001 | Foote et al. |
| 6,247,141 | B1 | 6/2001 | Homberg |
| 6,269,431 | B1 | 7/2001 | Dunham |
| 6,311,288 | B1 * | 10/2001 | Heeren et al. .............. 714/4.2 |
| 6,324,654 | B1 | 11/2001 | Wahl et al. |
| 6,327,579 | B1 | 12/2001 | Crawford |
| 6,490,691 | B1 | 12/2002 | Kimura et al. |
| 6,647,399 | B2 | 11/2003 | Zaremba |
| 6,691,140 | B1 | 2/2004 | Bogrett |
| 6,714,980 | B1 | 3/2004 | Markson et al. |
| 6,742,139 | B1 | 5/2004 | Forsman et al. |
| 6,833,073 | B2 | 12/2004 | Agarwal |
| 6,915,315 | B2 | 7/2005 | Autrey et al. |
| 6,981,177 | B2 | 12/2005 | Beattie |
| 7,093,086 | B1 | 8/2006 | Rietschote |
| 7,155,586 | B1 | 12/2006 | Wagner et al. |
| 7,165,156 | B1 | 1/2007 | Cameron et al. |
| 7,206,911 | B2 | 4/2007 | Wolfgang et al. |
| 7,237,021 | B2 | 6/2007 | Penney et al. |
| 7,251,749 | B1 | 7/2007 | Fong et al. |
| 7,254,682 | B1 | 8/2007 | Arbon |
| 7,839,865 | B2 * | 11/2010 | Doherty et al. .............. 370/397 |
| 2002/0008795 | A1 | 1/2002 | Koyama et al. |
| 2002/0124013 | A1 | 9/2002 | Loy et al. |
| 2003/0093579 | A1 | 5/2003 | Zimmer et al. |
| 2004/0031030 | A1 | 2/2004 | Kidder et al. |
| 2004/0093474 | A1 | 5/2004 | Lin et al. |
| 2004/0199515 | A1 | 10/2004 | Penney et al. |
| 2004/0205390 | A1 | 10/2004 | Kanevsky et al. |
| 2005/0010835 | A1 | 1/2005 | Childs et al. |
| 2005/0033930 | A1 | 2/2005 | Haruma et al. |
| 2005/0044162 | A1 | 2/2005 | Liang et al. |
| 2005/0050386 | A1 | 3/2005 | Reinhardt et al. |
| 2005/0055603 | A1 | 3/2005 | Soran et al. |
| 2005/0138090 | A1 | 6/2005 | Augenstein et al. |
| 2005/0138204 | A1 | 6/2005 | Iyer et al. |
| 2005/0182953 | A1 | 8/2005 | Stager et al. |
| 2005/0188256 | A1 | 8/2005 | Stager et al. |
| 2005/0198303 | A1 | 9/2005 | Knauerhase et al. |
| 2005/0223181 | A1 | 10/2005 | Jeppsen et al. |
| 2005/0240792 | A1 | 10/2005 | Sicola et al. |
| 2005/0251540 | A1 | 11/2005 | Sim-Tang |
| 2005/0257085 | A1 | 11/2005 | Haustein et al. |
| 2005/0262097 | A1 | 11/2005 | Sim-Tang et al. |
| 2005/0262377 | A1 | 11/2005 | Sim-Tang |
| 2005/0267920 | A1 | 12/2005 | Helliker et al. |
| 2006/0031468 | A1 | 2/2006 | Atluri et al. |
| 2006/0047714 | A1 | 3/2006 | Anderson et al. |
| 2006/0114497 | A1 | 6/2006 | Anderson et al. |
| 2006/0149793 | A1 | 7/2006 | Kushwah et al. |
| 2006/0155912 | A1 | 7/2006 | Singh et al. |
| 2006/0218434 | A1 | 9/2006 | Solhjell |
| 2007/0038998 | A1 | 2/2007 | Fries |
| 2007/0168404 | A1 | 7/2007 | Nakamura et al. |
| 2007/0244938 | A1 | 10/2007 | Michael et al. |

OTHER PUBLICATIONS

U.S. Appl. No. 11/438,401, filed Dec. 6, 2007, Atluri et al.
U.S. Appl. No. 11/438,036, filed Nov. 22, 2007, Atluri.
U.S. Appl. No. 11/229,289, filed Jan. 12, 2006, Atluri.
Neel, D., "Symantec Says It'll Put Data on Road to Recovery—New LiveState Une Promises Complete System Restoration," Computer Reseller News, Oct. 4, 2004, 12.
Kador, J., •Open MIddleware: The Next Generation in Distributed Computing, MIDRANGE Systems, Nov. 25, 1994, v.7, n.22, p. S12(4).
Data Protection—Perform Zero Downtime Backups [ online Jan. 29, 2009]. Retrieved from the Internet URL: http://stage.hp.resource.com/sbso/bus_protect/data_protect/zero_downtime.
HP Open View Storage Data Protector 5.1 Software [online] [retrieved on Jan. 29, 2009]. Retrieved from the Internet URL: http://www.hp.com/products1/storage/pdfs/media/OVDPds2.pdf.
Storagecraft Technology Corporation: Protecting Windows Servers and PCs with Fast and Reliable Online Backup and Bare Metal Recovery Solutions [online], 2004-2005.
[Retrieved on Jan. 29, 2009]. Retrieved from the Internet URL: http://www.rmwtug.org/Talks/ShadowStor/ShadowProtectdsheet.pdf.

* cited by examiner

| COMMAND 302 | RULE 304 | INITIATOR 306 | TARGET 308 | TIME RECEIVED 310 | OTHER 312 |
|---|---|---|---|---|---|
| READ | 11654 | PHYSICAL INITIATOR | PRIMARY STORAGE DEVICE | 3:14 PM | DATA READ |
| WRITE | 1514 | PHYSICAL INITIATOR | SECONDARY STORAGE DEVICE AND PRIMARY STORAGE DEVICE | 4:12 PM | WRITE SUCESSFUL |
| READ | 1351 | SECONDARY INITIATOR | PRIMARY STORAGE DEVICE | 5:02 PM | REQUEST TIMED OUT |
| ... | ... | ... | ... | ... | ... |

SWITCH TABLE 350

FIGURE 3

MINIMIZING CONFIGURATION CHANGES IN A FABRIC-BASED DATA PROTECTION SOLUTION

CROSS REFERENCE TO RELATED DOCUMENTS

The present invention is a continuation-in-part to U.S. Ser. No. 10/859,368, filed Jun. 1, 2004 now U.S. Pat. No. 7,698,401, U.S. Ser. No. 11/229,289, filed Sep. 16, 2005, and U.S. Ser. No. 11/438,036 filed May 19, 2006 and incorporates all of the disclosure of the priority cases at least by reference. U.S. Ser. No. 11/438,036 is a continuation-in-part of U.S. Ser. No. 10/859,368 and U.S. Ser. No. 11/229,289.

FIELD OF TECHNOLOGY

This disclosure relates generally to an enterprise method, a technical field of software and/or hardware technology and, in one example embodiment, to minimizing configuration of nodes through a switch virtualization technique.

BACKGROUND

A production server (e.g. a web server, an application server etc.) may be coupled to a collection of devices (e.g. a storage appliance, a secondary storage device etc.) in a storage network (e.g. a storage area network (SAN), a network designed to attach computer storage devices, a network switch compatible with a Fiber Channel protocol such as a Brocade® (AP7600 class switch and/or a FA4-18 blade that plugs into a switch, etc). The storage network may utilize a hierarchy of protocols (e.g. a Fiber Channel zoning protocol, a LUN masking protocol, a small computer system interface (SCSI) reservation protocol, etc.) to control access to one or more nodes in the storage network.

The Fiber Channel (e.g. gigabit-speed network technology used for storage networking) zoning protocol (e.g., partition a Fiber Channel fabric into smaller subsets to restrict interference, add security, simplify management, etc.) may restrict communication between a group of nodes of a Fiber Channel fabric (e.g. a switched fabric of Fiber Channel devices enabled by a Fiber Channel switch).

The LUN masking protocol may be an authorization process that makes the LUN available to a set of the collection of production servers and/or the collection of devices and unavailable to another set of the collection of production servers and/or the collection of devices. The SCSI reservation may limit access by an initiator for input/output (I/O) operations to a portion of a LUN represented storage volume.

An event may occur that may lead to a loss of the data (e.g. a disaster destroys the appliance upon which the data is stored, a user may accidentally delete a data file, a data file may be corrupted, a computer virus may damage the data, a network failure, etc.) stored in the network. Thus, an enterprise class data protection system (e.g. making copies of data so that these additional copies may be used to restore the original after a data loss event, etc.) may be used to back up the data in a collection of back up storage devices.

The enterprise class data protection system may require that backup servers have access to the protected storage (e.g. the storage used by a collection of production servers) and/or the collection of backup servers in order to request a data read and/or a data write in order to back up the data. However, the hierarchy of protocols may block the access of the backup storage device to the collection of production servers and/or the collection of backup storage devices.

Consequently, the backup storage devices may not be able to read and/or write data from the other devices in the computer network without altering the hierarchy of protocols. Altering the hierarchy of protocols may require the manual reconfiguration of the hierarchy of protocols of the storage network. This process may be time consuming and expensive and thus decrease the value of the enterprise class data protection system.

SUMMARY

A method, system, and apparatus of minimizing configuration of nodes through a switch virtualization technique are disclosed. In one aspect, the method includes configuring a switch (e.g., may be part of a storage area network) such that a write request (e.g., may originate from the physical initiator) to a primary storage device is transferred through a virtual initiator in the switch to the primary storage device and to a secondary storage device, configuring the switch such that a read request from the secondary initiator (e.g., may be bound to each of the physical initiators and using the binding to bypass a SCSI reservation) of a data (e.g., may be a current state of information on the primary storage device) in the primary storage device appears as though the read request is coming from a physical initiator rather than the secondary initiator (e.g., such that system protocol is bypassed because the switch intercepts a response having the data from the primary storage device through a virtual target which uses the virtual initiator of the switch to communicate the data to the secondary initiator rather than the physical initiator), and minimizing configuration of nodes (e.g., may include the physical initiator and/or the secondary initiator) of a continuous-backup system through the configuration of the switch and the interception of the response in the switch.

The write request may be transferred to the virtual target in the switch before being transferred through the virtual initiator in the switch to the primary storage device and/or to the secondary storage device. A binding between the primary storage device, the secondary storage device, the physical initiator, and/or the secondary initiator may be created through a frame redirect zone in a switch fabric and/or through an application of a twenty-four bit Fiber Channel address of the physical initiator to the virtual initiator in the switch (e.g., the virtual initiator may appear to the primary storage device as the physical initiator). The system protocol may be a Fiber Channel zoning protocol, logic unit number (LUN) masking protocol and/or a small computer system interface (SCSI) reservation protocol. This method, among others, may be used to create a binding.

In another aspect, a method includes receiving a write request from a physical initiator, transferring the write request through a virtual initiator of a switch (e.g., may be part of a storage area network) to a primary storage device and to a secondary storage device, bypassing at least one system protocol (e.g., may be Fiber Channel zoning protocol, logic unit number (LUN) masking protocol and/or a small computer system interface (SCSI) reservation protocol) when the switch intercepts a response having a data (e.g., may be a current state of information on the primary storage device) from the primary storage device through a virtual target of the switch which uses the virtual initiator of the switch to communicate the data to a secondary initiator rather than the physical initiator when the switch is configured such that a read request of the data of the primary storage device appears as though the read request is coming from the physical initiator rather than the secondary initiator.

The write request may be transferred to the virtual target in the switch before being transferred through the virtual initiator in the switch to the primary storage device and/or to the secondary storage device. A binding between the primary storage device, the secondary storage device, the physical initiator, and/or the secondary initiator may be created through a frame redirect zone in a switch fabric and/or through an application of a twenty-four bit Fiber Channel address of the physical initiator to the virtual initiator in the switch (e.g., the virtual initiator may appear to the primary storage device as the physical initiator). The switch may be part of a storage area network. The physical initiator and/or the secondary initiator may be nodes of the storage area network. The secondary initiator may bypass the SCSI reservation by using a multipath module to perform read input/ output operations. The storage device may be presented across a plurality of backup servers.

A method includes algorithmically determining a set of physical initiators to perform a discovery operation upon, establishing a binding between each physical initiator of the set of physical initiators and a secondary initiator, determining a physical target associated with a physical initiator of the set of physical initiators, algorithmically determining a set of logic unit numbers (LUN's) behind the physical target as available to the physical initiator, and algorithmically querying a LUN paired to the physical initiator.

The set of physical initiators may be determined through a fabric nameserver database (e.g., a service and/or an entity that may run on a Fibre Channel network and/or a Fibre Channel connected network that provides registration, query and/or translation services to connected nodes (of nodes that may be FC initiators and/or targets)). In addition, the set of physical initiators may determined a fabric zoning database (e.g., a service or an entity that may run in a Fibre Channel network and/or a Fibre Channel connected network that provides for and/or enforces restrictions on which nodes can view and/or access each other's resources). The set of physical initiators may also be determined with an algorithm that takes as an input the fabric nameserver database and the fabric zoning database and reduces a number of physical initiator and a number of physical target combinations upon which discovery has to be performed on. The set of physical initiators may be determined with a manual input. This method, among others, may also be used to create a binding.

In yet another aspect, the system of switch includes a transfer module to communicate a write request to a primary storage device through a virtual initiator in the switch (e.g., may be part of a storage area network) to the primary storage device and to a secondary storage device, an intercept module to make a read request of a data (e.g., may be a current state of information on the primary storage device) in the primary storage device appear as though the read request is coming from a physical initiator rather than a secondary initiator, such that at least one system protocol (e.g., may be a Fiber Channel zoning protocol, logic unit number (LUN) masking protocol and a small computer system interface (SCSI) reservation protocol) is bypassed because the switch intercepts a response having the data from the primary storage device through a virtual target which uses the virtual initiator of the switch to communicate the data to the secondary initiator rather than the physical initiator, and an optimization module to minimize configuration of nodes (e.g., may include the physical initiator and/or the secondary initiator) of a continuous-backup system through the configuration of the switch and/or the interception of the response in the switch.

The write request may be transferred to the virtual target in the switch before being transferred through the virtual initiator in the switch to the primary storage device and/or to the secondary storage device. A binding between the primary storage device, the secondary storage device, the physical initiator, and/or the secondary initiator may be created through a frame redirect zone in a switch fabric and/or through an application of a twenty-four bit Fiber Channel address of the physical initiator to the virtual initiator in the switch (e.g., the virtual initiator may appear to the primary storage device as the physical initiator). This method, among others, may also be used to create a binding.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3 is a table view illustrating various fields such as command, rule, initiator target etc., according to one embodiment.

Other features of the present embodiments will be apparent from the accompanying drawings and from the detailed description that follows.

DETAILED DESCRIPTION

A method, system, and apparatus of minimizing configuration of nodes through a switch virtualization technique are disclosed. Although the present embodiments have been described with reference to specific example embodiments, it will be evident that various modifications and changes may be made to these embodiments without departing from the broader spirit and scope of the various embodiments.

Figure 1:
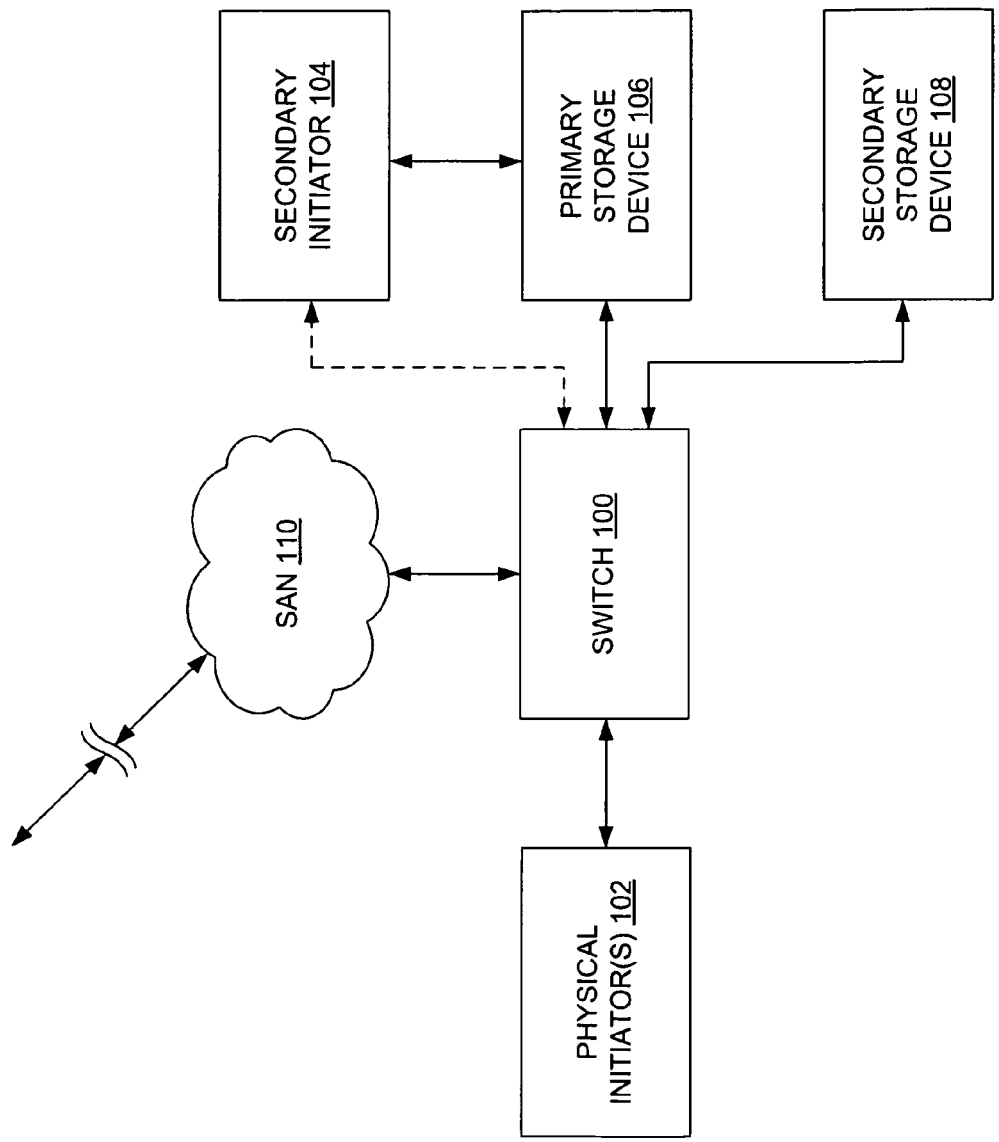
FIG. 1 is a system view in which a switch enables communication between physical initiator, secondary initiator, storage devices and storage area network, according to one embodiment.

In one embodiment, a method includes configuring a switch (e.g., the switch 100 of FIG. 1) (e.g., may be part of a storage area network) such that a write request (e.g., that may originate from the physical initiator(s) 102 and/or from a secondary initiator 104) to a primary storage device (e.g., the primary storage device 106 of FIG. 1) is transferred through a virtual initiator in the switch 100 to the primary storage device 106 and to a secondary storage device (e.g., the secondary storage device 108 of FIG. 1). The switch 100 may be configured such that a read request of a data (e.g., may be a current state of information on the primary storage device 106) in the primary storage device 106 appears as though the read request is coming from a physical initiator (e.g., the physical initiator(s) 102 of FIG. 1) rather than a secondary initiator (e.g., the secondary initiator 104 of FIG. 1) (e.g., such that the system protocol may be bypassed because the switch 100 intercepts a response having the data from the primary storage device 106 through a virtual target which uses the virtual initiator of the switch 100 to communicate the data to the secondary initiator 104 rather than the physical initiator(s) 102). Configuration of nodes (e.g., may include the physical initiator(s) 102 and/or the secondary initiator 104) of a continuous-backup system may be minimized through the configuration of the switch 100 and the interception of the response in the switch 100.

In another embodiment, the method includes receiving a write request from a physical initiator (e.g., the physical initiator(s) 102 of FIG. 1), transferring the write request through a virtual initiator of a switch (e.g., the switch 100 of FIG. 1) (e.g., may be part of a storage area network) to a primary storage device (e.g., the primary storage device 106 of FIG. 1) and to a secondary storage device (e.g., the secondary storage device 108 of FIG. 1), bypassing at least one system protocol (e.g., may be Fiber Channel zoning protocol, logic unit number (LUN) masking protocol and/or a small computer system interface (SCSI) reservation protocol) when the switch 100 intercepts a response having a data (e.g., may be a current state of information on the primary storage device) from the primary storage device 106 through a virtual target of the switch 100 which uses the virtual initiator of the switch 100 to communicate the data to a secondary initiator 104 rather than the physical initiator(s) 102 when the switch 100 is configured such that a read request of the data of the primary storage device 106 appears as though the read request is coming from the physical initiator(s) 102 rather than the secondary initiator 104.

In yet another embodiment, a switch (e.g., the switch 100 of FIG. 1) includes a transfer module (e.g., the transfer module 202 of FIG. 2) to communicate a write request to a primary storage device (e.g., the primary storage device 106 of FIG. 1) through a virtual initiator in the switch 100 (e.g., may be part of a storage area network) to the primary storage device 106 and to a secondary storage device (e.g., the secondary storage device 108 of FIG. 1), an intercept module (e.g., the intercept module 204 of FIG. 2) to make a read request of a data (e.g., may be a current state of information on the primary storage device) in the primary storage device 106 appear as though the read request is coming from a physical initiator (e.g., physical initiator(s) 102 of FIG. 1) rather than a secondary initiator (e.g., the secondary initiator 104 of FIG. 1), such that at least one system protocol (e.g., may be a Fiber Channel zoning protocol, logic unit number (LUN) masking protocol and/or a small computer system interface (SCSI) reservation protocol) is bypassed because the switch 100 intercepts a response having the data from the primary storage device 106 through a virtual target which uses the virtual initiator of the switch 100 to communicate the data to the secondary initiator 104 rather than the physical initiator(s) 102, and an optimization module (e.g., the optimization module 206 of FIG. 2) to minimize configuration of nodes (e.g., may include the physical initiator(s) 102 and/or the secondary initiator 104) of a continuous-backup system through the configuration of the switch 100 and/or the interception of the response in the switch 100.

FIG. 1 is a system view in which a switch enables communication between a physical initiator, a secondary initiator, storage devices and storage area network, according to one embodiment. Particularly, FIG. 1 illustrates a switch 100, a physical initiator(s) 102, a secondary initiator 104, a primary storage device 106, a secondary storage device 108, and a SAN 110, according to one embodiment.

The switch 100 may be a device used for networking (e.g., connecting network segments) that may communicate the request/responses between the initiators, storage devices, storage area networks etc. to transfer the data between the devices. The physical initiator(s) 102 may be a computer, controllers, servers, other client devices etc., which may make a read/write request from the target machines in the network. The secondary initiator 104 be may be a server/data processing device, computer, etc. which may be one of the nodes of the switch 100.

The primary storage device 106 may be a memory device (e.g., RAM, cache memory, flash memory, hard drive, etc.) that may be used for storing (e.g., recording, holding information, etc.) the data. The secondary storage device 108 may be hard disk, optical storage devices (e.g., CD, DVD, etc.), flash memory etc. that may be used to store (e.g., hold information, etc.) the data. The SAN 110 may be architecture (e.g., arrangement, network, etc.) to attach remote storage devices (e.g., disk arrays, optical jukeboxes, flash devices, etc.) to the switch 100 in a way that makes the devices appear as locally attached to the operating system.

In an example embodiment, the switch 100 may connect the physical initiator(s) 102, the secondary initiator 104, the primary storage device 106, the secondary storage device 108 and the SAN 110. The switch 100 may communicate the read/write request to/from the physical initiator(s) 102, the secondary initiator 104, to the primary storage device 106, to the SAN 110 and/or to the secondary storage device. The switch 100 may communicate with storage Area Network (SAN) 110 to connect the other storage devices connected in the network.

In one embodiment, the switch 100 may be configured such that the write request to the primary storage device 106 may be transferred through the virtual initiator in the switch 100 to the primary storage device 106 and/or to the secondary storage device 108. The switch 100 may also be configured such that the read request from the secondary initiator 104 of the data in the primary storage device 106 may appear as though the read request is coming from the physical initiator(s) 102 rather than the secondary initiator 104 (e.g., such that system protocol may be bypassed because the switch 100 may intercept a response having the data from the primary storage device 106 through the virtual target which may use the virtual initiator of the switch 100 to communicate the data to the secondary initiator 104 rather than the physical initiator(s) 102). Configuration of nodes of the continuous-backup system may be minimized through the configuration of the switch 100 and/or the interception of the response in the switch 100.

The write request may originate from the physical initiator(s) 102. The set of physical initiators may be algorithmically determined to perform a discovery operation upon. The binding may be established between each physical initiator of the set of physical initiators and a secondary initiator. The physical target associated with the physical initiator(s) 102 may be determined of the set of physical initiators. The set of logic unit numbers (LUN's) behind the physical target may algorithmically determined as available to the physical initiator. The LUN paired to the physical initiator(s) 102 may be algorithmically queried. The set of physical initiators may be determined through a fabric nameserver database (e.g., A service and/or an entity that may run on a Fibre Channel network and/or a Fibre Channel connected network that provides registration, query and/or translation services to connected nodes (of nodes that may be FC initiators and/or targets)).

The set of physical initiators may determined a fabric zoning database (e.g., a service or an entity that may run in a Fibre Channel network and/or a Fibre Channel connected network that provides for and/or enforces restrictions on which nodes can view and/or access each other's resources). The set of physical initiators may also be determined with an algorithm that takes as an input the fabric nameserver database (e.g., A service and/or an entity that may run on a Fibre Channel network and/or a Fibre Channel connected network that provides registration, query and/or translation services to connected nodes (of nodes that may be FC initiators and/or targets)) and the fabric zoning database (e.g., a service or an entity that may run in a Fibre Channel network and/or a Fibre Channel connected network that provides for and/or enforces restrictions on which nodes can view and/or access each other's resources) and reduces a number of physical initiator and a number of physical target combinations upon which discovery has to be performed on. The set of physical initiators may be determined with a manual input.

Figure 2:
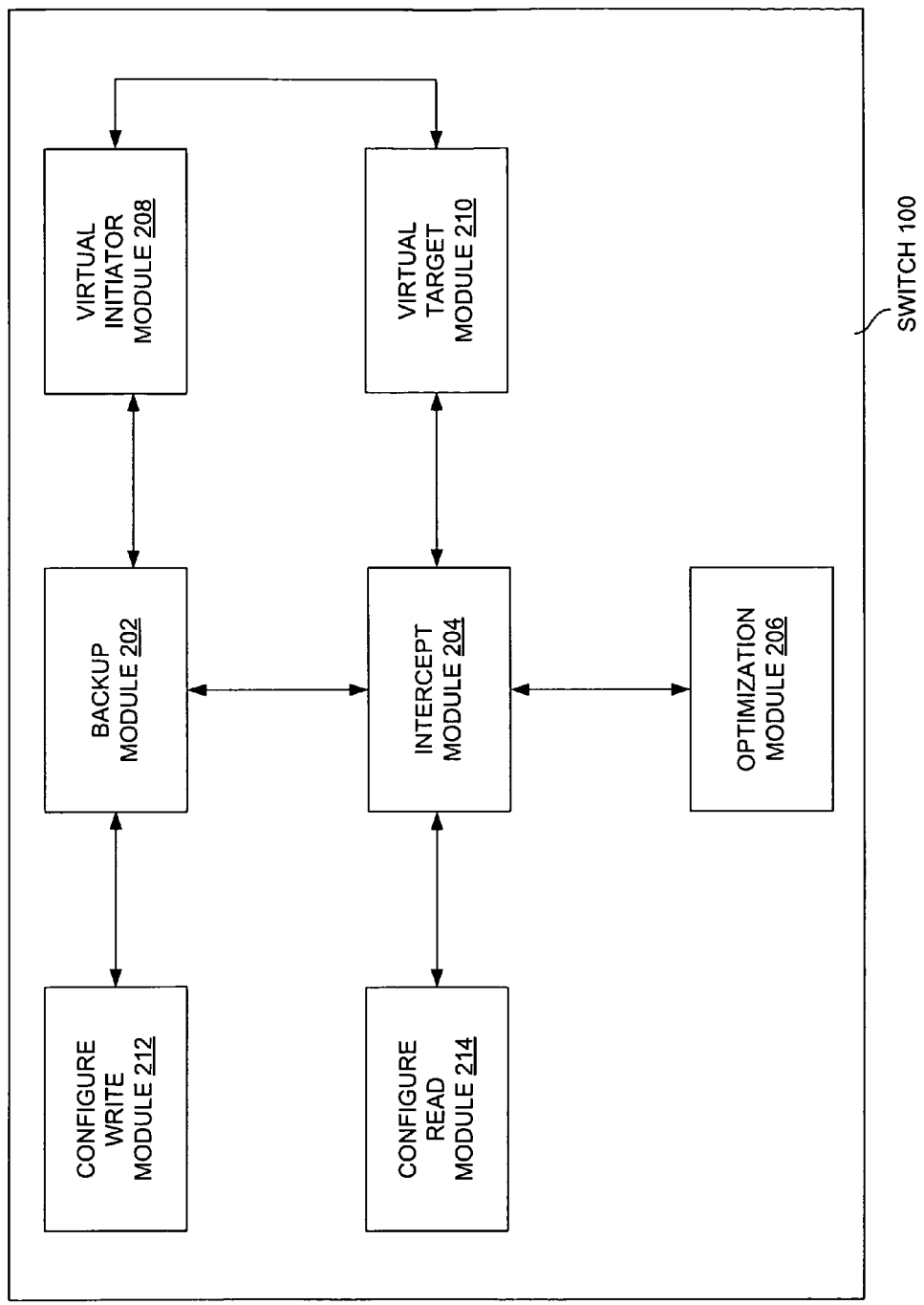
FIG. 2 is an exploded view of the switch illustrated in FIG. 1, according to one embodiment.

FIG. 2 is an exploded view of switch 100 illustrated in FIG. 1, according to one embodiment. Particularly, FIG. 2 illustrates a transfer module 202, an intercept module 204, an optimization module 206, a virtual initiator module 208, a virtual target module 210, a configure write module 212, and a configure read module 214, according to one embodiment.

The transfer module 202 may communicate a write request (e.g., a command packet for writing data) to a target device (e.g., may be the primary storage device 106, the secondary storage device 108, and/or to the SAN 110, etc.) through the virtual initiator in the switch 100. The intercept module 204 may make the read request of a data in the primary storage device appear as though the read request is coming from the physical initiator(s) 102 (e.g., may be by configuring the switch 100) rather than the secondary initiator 104 (e.g., may be by bypassing system protocols). The optimization module 206 may minimize the configuration (e.g., designing, assigning IP address, etc.) of nodes (e.g., point of connections where devices like computers, workstations, servers, etc. are connected) of the switch (e.g., the physical initiator(s) 102, the secondary initiator 104, etc.).

The virtual initiator module 208 may be a software (e.g., may be an application, program, etc.) that may be used to manage (e.g., control, communicate, route, etc.) request, responses, and/or flow of data through the switch 100. The virtual target module 210 may be used to intercept responses (e.g., resulting from requests such as data fetch, data transfer, etc.) from the storage devices (e.g., may be through the virtual target). The configure write module 212 may be used to configure (e.g., process) a write requests to the primary storage device 106, the SAN 110 and/or the secondary storage device 108 from the initiators. The configure read module 214 of the switch 100 may configure (e.g., process) a read request from the initiator to read the data (e.g., content, information) in the storage devices.

In example embodiment, the transfer module 202 may communicate with the configure write module 212. The intercept module 204 may communicate with the transfer module 202, the optimization module 206, and the virtual target module 210. The virtual target module 210 may communicate with the virtual initiator module 208. The virtual initiator module 208 may communicate with the transfer module 202.

In one embodiment, the transfer module 202 may communicate a write request to the primary storage device 106 through the virtual initiator in the switch 100 to the primary storage device 106 and/or to the secondary storage device 108. The intercept module 204 may make a read request of the data in the primary storage device 106 appear as though the read request is coming from the physical initiator(s) 102 rather than the secondary initiator 104 (e.g., such that system protocol may be bypassed because the switch 100 may intercept a response having the data from the primary storage device 106 through the virtual target which may use the virtual initiator of the switch 100 to communicate the data to the secondary initiator 104 rather than the physical initiator(s) 102).

The optimization module 206 may minimize configuration of nodes of the continuous-backup system through the configuration of the switch 100 and/or the interception of the response in the switch 100. The write request may be transferred to the virtual target in the switch 100 before being transferred through the virtual initiator in the switch 100 to the primary storage device 106 and to the secondary storage device 108. The binding between the primary storage device 106, the secondary storage device 108, the physical initiator (s) 102, and/or the secondary initiator 104 may be created through a frame redirect zone in a switch fabric and/or through an application of a twenty-four bit Fiber Channel address of the physical initiator(s) 102 to the virtual initiator in the switch 100 such that the virtual initiator may appear to the primary storage device 106 as the physical initiator(s) 102. The system protocol may be a Fiber Channel zoning protocol, logic unit number (LUN) masking protocol and/or a small computer system interface (SCSI) reservation protocol.

FIG. 3 is a table view illustrating various fields such as command, rule, initiator target etc., according to one embodiment. Particularly, FIG. 3 illustrates a command field 302, a rule field 304, an initiator field 306, a target field 308, a time received field 310, and an other field 312, according to one embodiment.

The command field 302 may indicate the commands such as read and/or write made by the initiators (e.g., the physical initiator(s) 102 and/or the secondary initiator 104 of FIG. 1). The rule field 304 may indicate the rule numbers which may enable the switch to perform commands associated to the rules. The initiator field 306 may denote the initiator which may have made a command (e.g., read request, write request, etc.) to the switch 100 to implement the command using the storage devices.

The target field 308 may indicate the target devices (e.g., storage devices, storage network, etc.) which of the commands may be executed by the switch to perform actions (e.g., read operation, write operation, etc.). The time received field 310 may illustrate the time (e.g., system time, server time, etc.) at which the command (e.g., read/write request) is issued by the initiators to perform operations associated to the command. The other field 312 may indicate other information associated to the operations that may be performed on the storage devices.

In example embodiment, the command field 302 may illustrate read command in first row, write command in second row, read command in third row, etc. The rule field 304 may illustrate rule numbers that may enable execution of certain operations. The rule field 304 may illustrate rule numbers such as rule "11654" in first row, rule "1514" in second row, and rule "1351" in third row. The initiator field 306 may illustrate initiator as "physical initiator" in the first row, "physical initiator" in the second row and "secondary initiator" in the third row. The target field 308 may illustrate target devices such as "primary storage device" in the first row, "primary storage device and secondary storage device" in the second row and "primary storage device" in the third row. The time received 310 may illustrate timing information such as "3:14 PM" in first row, "4:12 PM" in second row, "5:02 PM" in third row. The other field 312 may illustrate "data read" in the first row, "write successful" in the second row, and "request timed out" in the third row, according to one embodiment.

Figure 4:
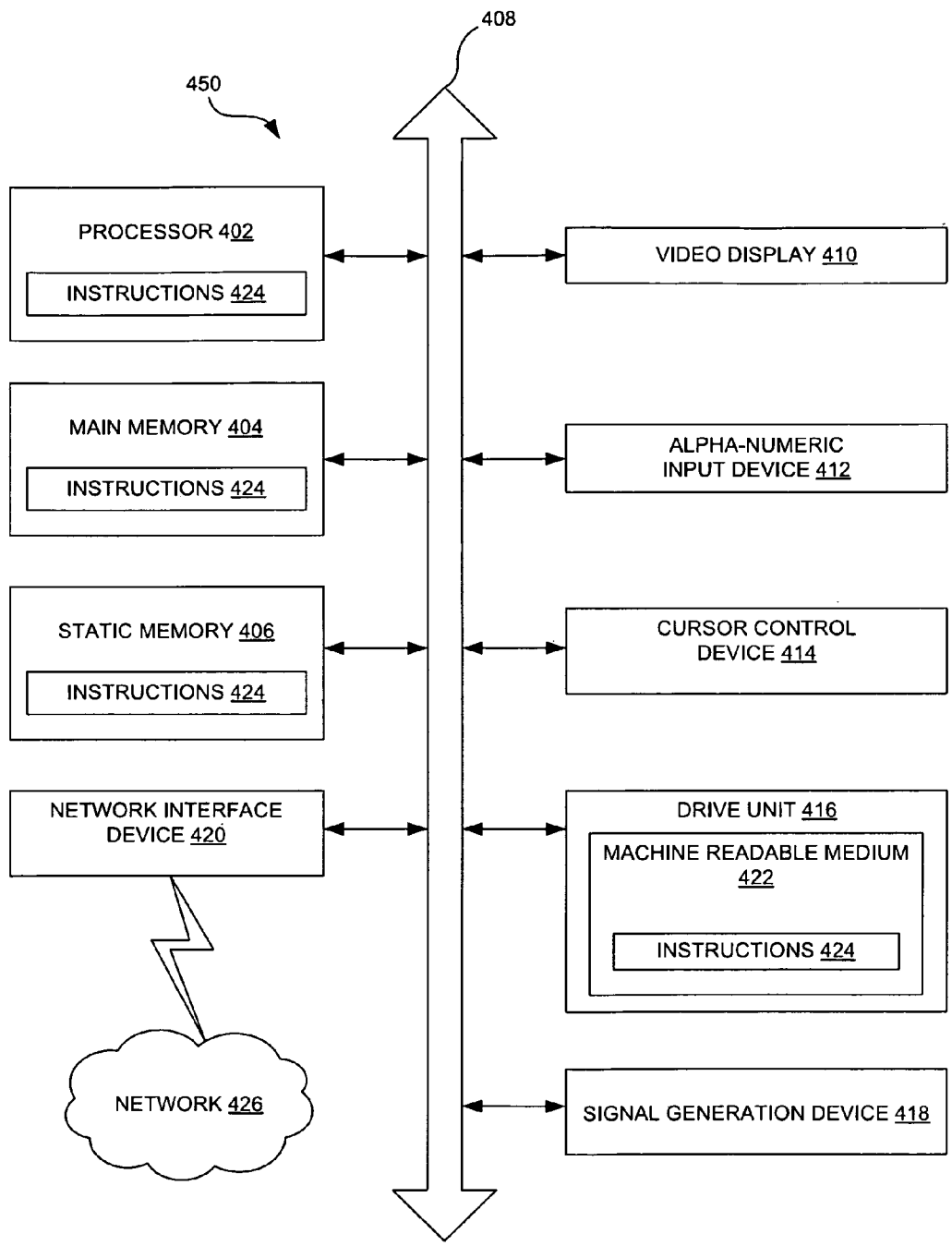
FIG. 4 is a diagrammatic system view of a data processing system in which any of the embodiments disclosed herein may be performed, according to one embodiment, according to one embodiment

FIG. 4 is a diagrammatic system view of a data processing system in which any of the embodiments disclosed herein may be performed, according to one embodiment. Particularly, the diagrammatic system view 400 of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424, and a network 426, according to one embodiment.

The diagrammatic system view 400 may indicate a personal computer and/or the data processing system in which one or more operations disclosed herein are performed. The processor 402 may be a microprocessor, a state machine, an application specific integrated circuit, a field programmable gate array, etc. (e.g., Intel® Pentium® processor). The main memory 404 may be a dynamic random access memory and/or a primary memory of a computer system.

The static memory 406 may be a hard drive, a flash drive, and/or other memory information associated with the data processing system. The bus 408 may be an interconnection between various circuits and/or structures of the data processing system. The video display 410 may provide graphical representation of information on the data processing system. The alpha-numeric input device 412 may be a keypad, a keyboard and/or any other input device of text (e.g., a special device to aid the physically handicapped).

The cursor control device 414 may be a pointing device such as a mouse. The drive unit 416 may be the hard drive, a storage system, and/or other longer term storage subsystem. The signal generation device 418 may be a bios and/or a functional operating system of the data processing system. The network interface device 420 may be a device that performs interface functions such as code conversion, protocol conversion and/or buffering required for communication to and from the network 426. The machine readable medium 422 may provide instructions on which any of the methods disclosed herein may be performed. The instructions 424 may provide source code and/or data code to the processor 402 to enable any one or more operations disclosed herein.

Figure 5:
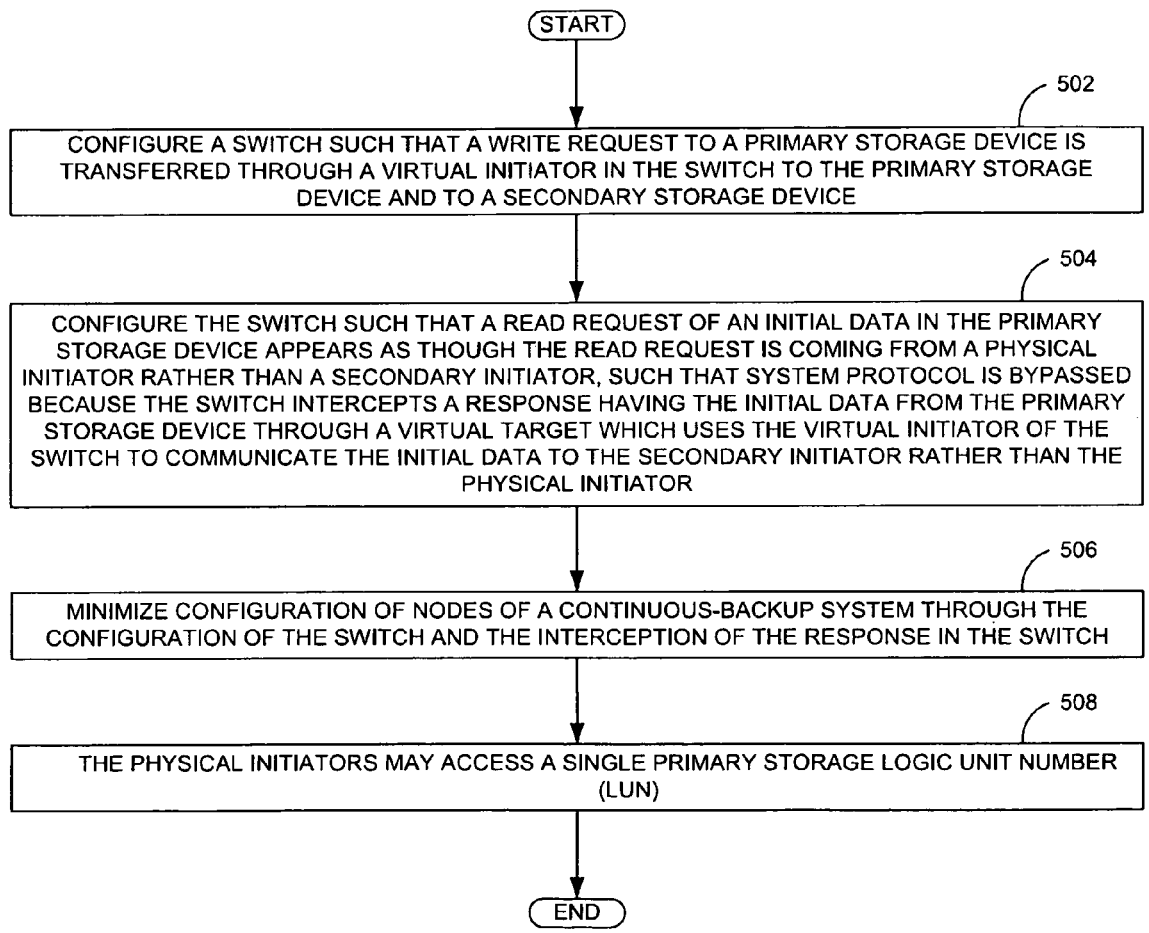
FIG. 5 is a process flow of configuring a switch, according to one embodiment.

FIG. 5 is a process flow of configuring a switch (e.g., the switch 100 of FIG. 1). In operation 502, the switch 100 may be configured such that a write request to a primary storage device (e.g., the primary storage device 106 of FIG. 1) is transferred (e.g., using the transfer module 202 of FIG. 2) through a virtual initiator in the switch 100 to the primary storage device 106 and to a secondary storage device (e.g., the secondary storage device 108 of FIG. 1). In operation 504, the switch 100 may be configured (e.g., using the intercept module 204 of FIG. 2) such that a read request of the data in the primary storage device 106 appears as though the read request is coming from a physical initiator (e.g., the physical initiator(s) 102 of FIG. 1) rather than a secondary initiator (e.g., the secondary initiator 104 of FIG. 1), such that system protocol may be bypassed because the switch 100 intercepts a response having the data from the primary storage device 106 through a virtual target which uses the virtual initiator of the switch to communicate the data to the secondary initiator 104 rather than the physical initiator(s) 102.

In operation 506, configuration of nodes of a continuous-backup system may be minimized (e.g., using the optimization module 206 of FIG. 2) through the configuration of the switch 100 and the interception of the response in the switch 100. The write request may originate from the physical initiator(s) 102. The write request may be transferred to the virtual target in the switch 100 before being transferred through the virtual initiator in the switch 100 to the primary storage device 106 and to the secondary storage device 108. The binding between the primary storage device 106, the secondary storage device 108, the physical initiator(s) 102, and the secondary initiator 104 may be created through a frame redirect zone in a switch fabric and/or through an application of a twenty-four bit Fiber Channel address of the physical initiator(s) 102 to the virtual initiator in the switch 100 such that the virtual initiator may appear to the primary storage device 106 as the physical initiator(s) 102.

The system protocol maybe a Fiber Channel zoning protocol, logic unit number (LUN) masking protocol and/or a small computer system interface (SCSI) reservation protocol. The switch 100 may be part of a storage area network. The nodes may include the physical initiator(s) 102 and/or the secondary initiator 104. The data may be a current state of information on the primary storage device 106.

Figure 6:
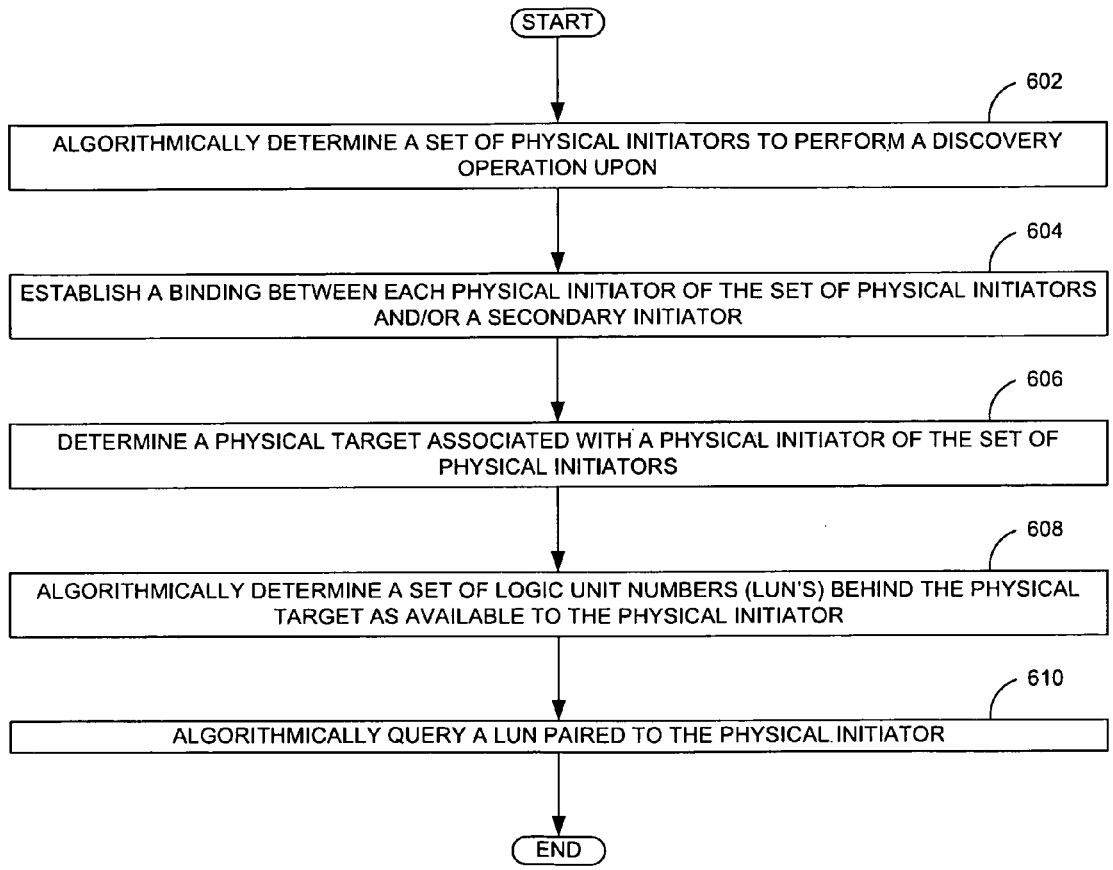
FIG. 6 is a process flow of algorithmically determining the set of physical initiators to perform a discovery operation, according to one embodiment.

FIG. 6 is a process flow of algorithmically determining the set of physical initiators (e.g., the physical initiator(s) 102 of FIG. 1) to perform a discovery operation, according to one embodiment. In operation 602, the set of physical initiators 102 may be algorithmically determined (e.g., may be by through inputs from a fabric nameserver database and/or a fabric zoning database) to perform a discovery operation upon (e.g., that may reduce a number of physical initiator and a number of physical target combinations). In operation 604, a binding may be established (e.g., may be through a frame redirect zone in a switch fabric and/or through an application of a twenty-four bit Fiber Channel address of the physical initiator 102 to the virtual initiator in the switch 100) between each physical initiator of the set of physical initiators and a secondary initiator (e.g., the secondary initiator 104 of FIG. 1).

In operation 606, a physical target associated with a physical initiator of the set of physical initiators may be determined. In operation 608, a set of logic unit numbers (LUN's) behind the physical target may be algorithmically determined as available to the physical initiator. In operation 610, a LUN paired to the physical initiator algorithmically queried.

The fabric nameserver database may be a service and/or entity that may run in a Fibre Channel network and/or a Fibre Channel connected network that provides registration, query and/or translation services to connected nodes (e.g., of nodes that may be FC initiators and/or targets). The fabric zoning database may be a service and/or an entity that may run in a Fibre Channel network and/or a Fibre Channel connected network that provides for and/or enforces restrictions on which nodes can view and/or access each other's resources.

The set of physical initiators may be determined through the fabric nameserver database. In addition, the set of physical initiators may be determined through the fabric zoning database. The set of physical initiators may also be determined with an algorithm that takes as an input the fabric nameserver database and the fabric zoning database and reduces a number of physical initiator and a number of physical target combinations upon which discovery has to be performed on. The set of physical initiators may be determined with a manual input.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the transfer module 202, the intercept module 204, the optimization module 206, the virtual initiator module 208, the virtual target module 210, the configure write module 212, and the configure read module 214 may be enabled using software and/or using transistors, logic gates, and electrical circuits (e.g., application specific integrated ASIC circuitry) such as a transfer circuit, an intercept circuit, an optimization circuit, a virtual initiator circuit, a virtual target circuit, a configure write circuit, and a configure read circuit and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The invention claimed is:

1. A method, comprising:
    configuring a switch such that a write request to a primary storage device is transferred through a virtual initiator in the switch to the primary storage device and to a secondary storage device;
    configuring the switch such that a read request from a secondary initiator of data in the primary storage device appears as though the read request is coming from a physical initiator rather than the secondary initiator, such that at least one system protocol is bypassed because the switch intercepts a response having the data from the primary storage device through a virtual target which uses the virtual initiator of the switch to communicate the data to the secondary initiator rather than the physical initiator;
    minimizing configuration of nodes of a continuous-backup system through the configuration of the switch and the interception of the response in the switch; and
    wherein a binding between the primary storage device, the secondary storage device, the physical initiator, and the secondary initiator is created through a frame redirect zone in a switch fabric and through an application of a twenty-four bit Fiber Channel address of the physical initiator to the virtual initiator in the switch such that the virtual initiator appears to the primary storage devices as the physical initiator.

2. The method of claim 1 wherein the write request originates from the physical initiator.

3. The method of claim 2 wherein the write request is transferred to the virtual target in the switch before being transferred through the virtual initiator in the switch to the primary storage device and to the secondary storage device.

4. The method of claim 1, wherein the at least one system protocol is at least one of a Fiber Channel zoning protocol, logic unit number (LUN) masking protocol and a small computer system interface (SCSI) reservation protocol.

5. The method of claim 4:
    further comprising a plurality of physical initiators that access a single primary storage logic unit number (LUN);
    wherein the secondary initiator is bound to each of the plurality of physical initiators and using the binding to bypass a SCSI reservation.

6. The method of claim 5 wherein the secondary initiator bypasses the SCSI reservation by using a multipath module to perform read input/output operations.

7. The method of claim 6 wherein the storage device can be presented across a plurality of backup servers.

8. The method of claim 1 wherein the switch is part of a storage area network, and wherein the nodes include the physical initiator and the secondary initiator.

9. The method of claim 1 wherein the data is a current state of information on the primary storage device.

10. The method of claim 1 in a form of a machine-readable storage medium embodying a set of instructions that, when executed by a machine, causes the machine to perform the method of claim 1.

11. A system of a switch, comprising:
    a transfer module to communicate a write request to a primary storage device through a virtual initiator in the switch to the primary storage device and to a secondary storage device;
    an intercept module to make a read request of a data in a primary storage device appear as though the read request is coming from a physical initiator rather than a secondary initiator, such that at least one system protocol is bypassed because the switch intercepts a response having the data from the primary storage device through a virtual target which uses the virtual initiator of the switch to communicate the data to the secondary initiator rather than the physical initiator;
    an optimization module to minimize configuration of nodes of a continuous-backup system through the configuration of the switch and the interception of the response in the switch; and
    wherein a binding between the primary storage device, the secondary storage device, the physical initiator, and the secondary initiator is created through a frame redirect zone in a switch fabric and through an application of a twenty-four bit Fiber Channel address of the physical initiator to the virtual initiator in the switch such that the virtual initiator appears to the primary storage devices as the physical initiator.

12. The switch of claim 11 wherein the write request is transferred to the virtual target in the switch before being transferred through the virtual initiator in the switch to the primary storage device and to the secondary storage device.

13. The switch of claim 11 wherein the at least one system protocol is at least one of a Fiber Channel zoning protocol, logic unit number (LUN) masking protocol and a small computer system interface (SCSI) reservation protocol.

14. The switch of claim 11 wherein the switch is part of a storage area network, and wherein the nodes include the physical initiator and the secondary initiator.

15. The switch of claim 11 wherein the data is a current state of information on the primary storage device.

* * * * *